(12) United States Patent
Motohashi

(10) Patent No.: US 7,085,538 B2
(45) Date of Patent: Aug. 1, 2006

(54) PORTABLE COMMUNICATION TERMINAL WITH IMAGE TRANSMISSION FUNCTION

(75) Inventor: Teruyuki Motohashi, Tokyo (JP)

(73) Assignee: NEC Corporation, Tokyo (JP)

( * ) Notice: Subject to any disclaimer, the term of this patent is extended or adjusted under 35 U.S.C. 154(b) by 635 days.

(21) Appl. No.: 09/975,233

(22) Filed: Oct. 11, 2001

(65) Prior Publication Data

US 2002/0055372 A1 May 9, 2002

(30) Foreign Application Priority Data

Oct. 12, 2000 (JP) .............................. 2000-312472

(51) Int. Cl.
H04B 17/00 (2006.01)
(52) U.S. Cl. ............... 455/67.11; 455/67.7; 455/67.14; 455/226.2; 455/556.1; 455/566; 348/14.02
(58) Field of Classification Search ............. 455/67.11, 455/67.7, 67.14, 226.1, 226.2, 226.4, 556.1, 455/566, 567; 348/14.02
See application file for complete search history.

(56) References Cited

U.S. PATENT DOCUMENTS

| | | | | |
|---|---|---|---|---|
| 5,630,209 A | * | 5/1997 | Wizgall et al. | ............. 455/521 |
| 5,689,813 A | * | 11/1997 | Seki | ........................... 455/67.7 |
| 5,825,408 A | * | 10/1998 | Yuyama et al. | .......... 348/14.01 |
| 6,073,005 A | * | 6/2000 | Raith et al. | ............... 455/404.1 |
| 6,192,257 B1 | * | 2/2001 | Ray | ........................... 455/566 |
| 6,687,515 B1 | * | 2/2004 | Kosaka | ........................ 455/566 |
| 2002/0009978 A1 | * | 1/2002 | Dukach et al. | ................ 455/99 |

FOREIGN PATENT DOCUMENTS

JP 9-148975 6/1997

OTHER PUBLICATIONS

Copy of The People's Republic of China Office Action dated Apr. 11, 2003 (and English translation of same).

* cited by examiner

*Primary Examiner*—Quochien B. Vuong
*Assistant Examiner*—Minh Dao
(74) *Attorney, Agent, or Firm*—Dickstein, Shapiro, Morin & Oshinsky, LLP.

(57) ABSTRACT

The invention provides a portable communication terminal with an image transmission function which can convey a reception electric field intensity state of and generation of a communication quality alarm in the portable communication terminal itself in the form of an image to the opposite party of communication. A control section controls a display section to display a reception electric field intensity of the portable communication terminal in accordance with an electric field intensity information signal from a radio communication function section. During image communication, an electric field intensity display image is transmitted as a transmission image together with an image picked up by an image pickup section. If a communication quality alarm is generated by the control section because of deterioration of the circuit quality during the communication, then an alarm image stored in advance in a memory is transmitted together with or in place of the image picked up by the image pickup section.

7 Claims, 10 Drawing Sheets

FIG. 6
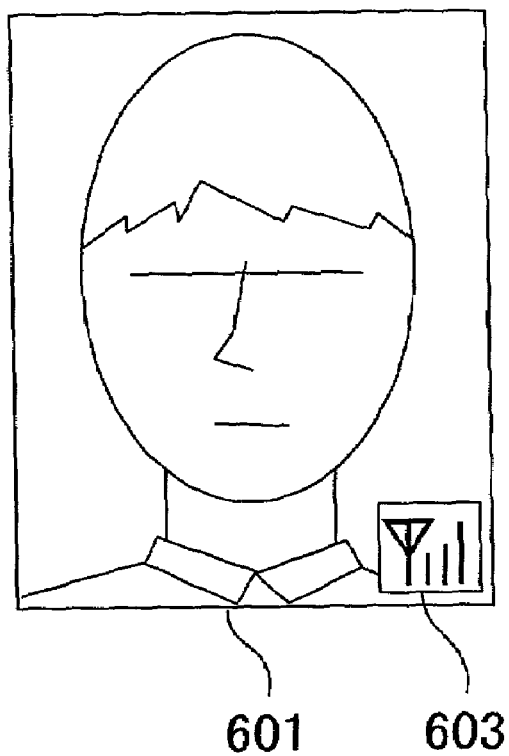
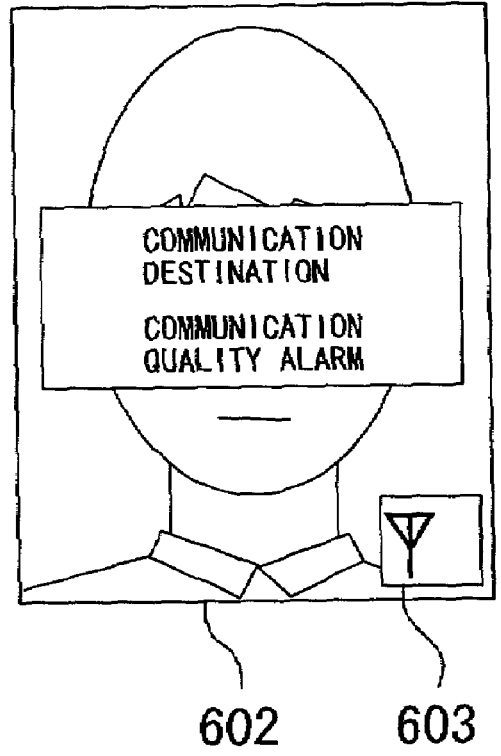
601   603         602   603

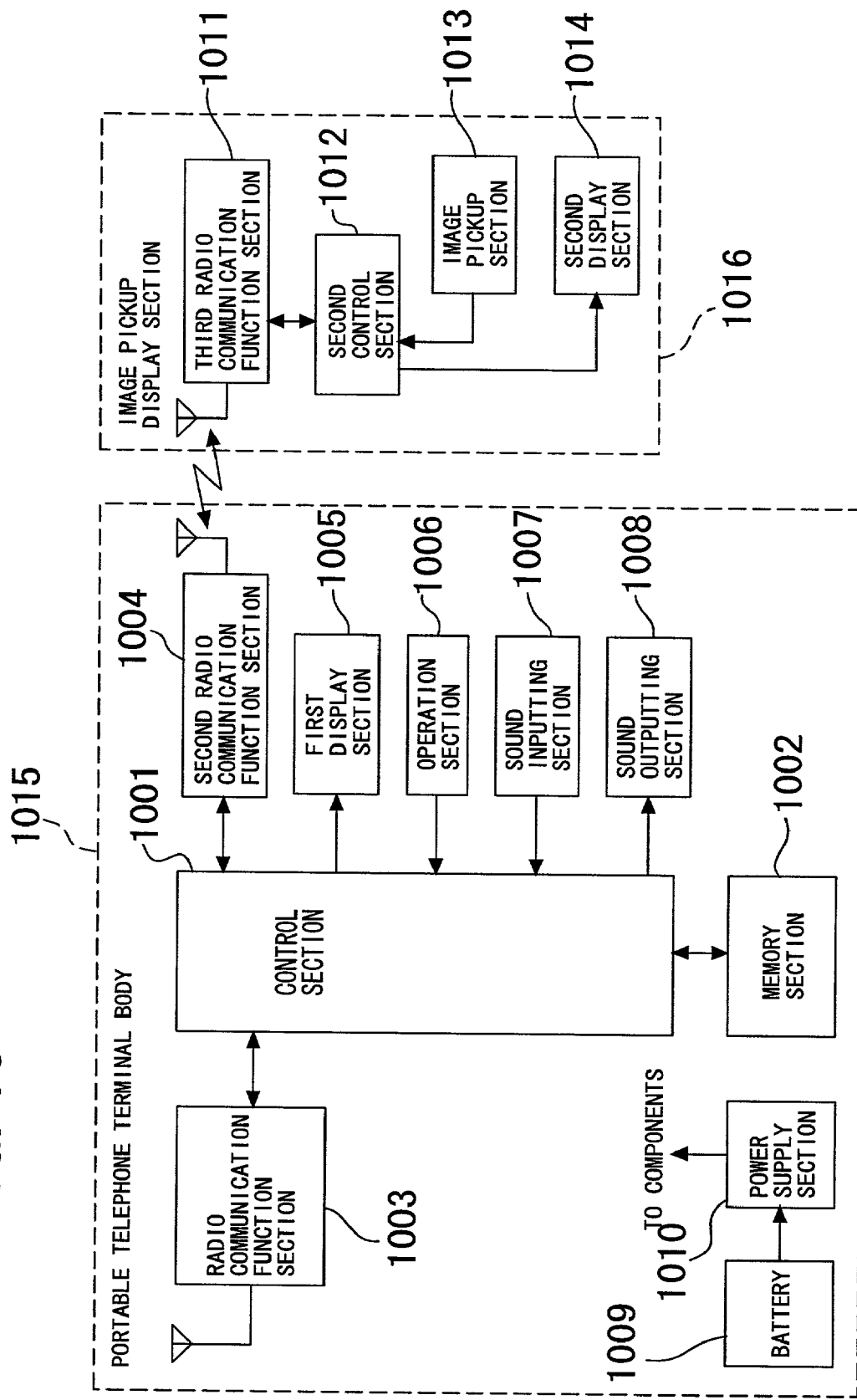

PORTABLE COMMUNICATION TERMINAL WITH IMAGE TRANSMISSION FUNCTION

BACKGROUND OF THE INVENTION

1. Field of the Invention

The present invention relates to a portable communication terminal with an image transmission function of transmitting an image such as a portable telephone set or a portable digital assistant (PDA).

2. Description of the Related Art

A portable telephone terminal utilizes a radio communication circuit. Therefore, the portable telephone terminal is superior in portability and can communicate even during movement. However, since the circuit quality varies depending upon the electric field situation, the portable telephone terminal displays a reception electric field level thereof to inform the carrying person of the situation of the electric field at the place of use. Further, when the circuit quality deteriorates during communication, the portable telephone terminal issues a communication quality alarm to notify the user that interruption of the communication may possibly occur.

However, with the conventional portable telephone terminal, information of the reception electric field intensity of it is not conveyed to the opposite party of communication. Therefore, the portable telephone terminal is disadvantageous in that, even if it is moving in a direction in which the reception electric field level thereof drops, it cannot urge this on an attention of the opposite party of communication. The portable telephone terminal is disadvantageous also in that, when a communication quality alarm is generated therein, this is not conveyed definitely to the opposite party of communication because the circuit quality is already in a deteriorated state. Particularly with a portable telephone terminal with a visual telephone function which communicates not only voice but also an image with the opposite party, interruption of an image or sudden deterioration of the picture quality provides a loss in information communication and a disagreeable feeling to the user much greater than where only communication of voice is involved.

SUMMARY OF THE INVENTION

It is an object of the present invention to provide a portable communication terminal capable of transmitting an image such as a portable communication terminal with a visual telephone function which can convey a reception electric field intensity state of and generation of a communication quality alarm in the portable communication terminal itself in the form of an image to the opposite party of communication.

In order to attain the object described above, according to the present invention, there is provided a portable communication terminal with an image transmission function for transmitting an image, comprising reception electric field intensity detection means for detecting a reception electric field intensity of the portable communication terminal, and reception electric field intensity image transmission means for transmitting a reception electric field intensity image representative of the detected reception electric field intensity to the opposite party of communication.

Where the portable communication terminal further comprises an image pickup section for picking up an image, preferably the reception electric field intensity image transmission means transmits the reception electric field intensity image together with an image picked up by the image pickup section.

Irrespective of whether or not the portable communication terminal comprises the image pickup section, preferably it further comprises reception electric field intensity transmission setting means for setting whether or not the reception electric field intensity image should be transmitted, communication quality alarm image transmission means for transmitting a communication quality alarm image to the opposite party of communication when a communication quality alarm is generated in the portable communication terminal, or communication quality alarm transmission setting means for setting whether or not a communication quality alarm image should be transmitted.

The image pickup section may be removably and externally provided on a body of the portable communication terminal or may alternatively be provided separately from a body of the portable communication terminal and includes a radio communication function section which communicates by radio with a radio communication function section of the body of the portable communication terminal.

Preferably, a body of the portable communication terminal has a visual telephone function and the image pickup section has a display section capable of displaying an image received from the opposite party by the body of the portable communication terminal when the visual telephone function is operative.

In the portable communication terminal with an image transmission function for transmitting an image such as a still image or a moving image, the reception electric field intensity detection means detects a reception electric field intensity of the portable communication terminal. Then, the reception electric field intensity image transmission means transmits a reception electric field intensity image representative of the detected reception electric field intensity to the opposite party of communication. In this instance, the reception electric field intensity image is transmitted solely or together with an image picked up by the image pickup section provided removably and externally on or provided separately from the body of the portable telephone set. Further, if a communication quality alarm is generated in the portable telephone set because of deterioration of the circuit quality, then the communication quality alarm image is transmitted together with or in place of the image picked up by the image pickup section.

Accordingly, with the portable communication terminal, since an image representative of an electric field intensity state of the portable communication terminal is transmitted as an image by itself or together with an image picked up by the portable communication terminal and besides an alarm image is transmitted if a communication quality alarm is generated in the portable communication terminal, the electric field intensity and the circuit quality state are transmitted automatically to the opposite party of communication. Consequently, a countermeasure for preventing expected disconnection of the circuit during communication can be taken, and the portable communication terminal can be used with improved convenience.

The above and other objects, features and advantages of the present invention will become apparent from the following description and the appended claims, taken in conjunction with the accompanying drawings in which like parts or elements are denoted by like reference symbols.

BRIEF DESCRIPTION OF THE DRAWINGS

FIG. 6 is a schematic view showing another example of a transmission image by the portable communication terminal of FIG. 1;

FIGS. 8 to 10 are block diagrams showing configurations of different portable communication terminals to which the present invention is applied.

DESCRIPTION OF THE PREFERRED EMBODIMENTS

Figure 1:
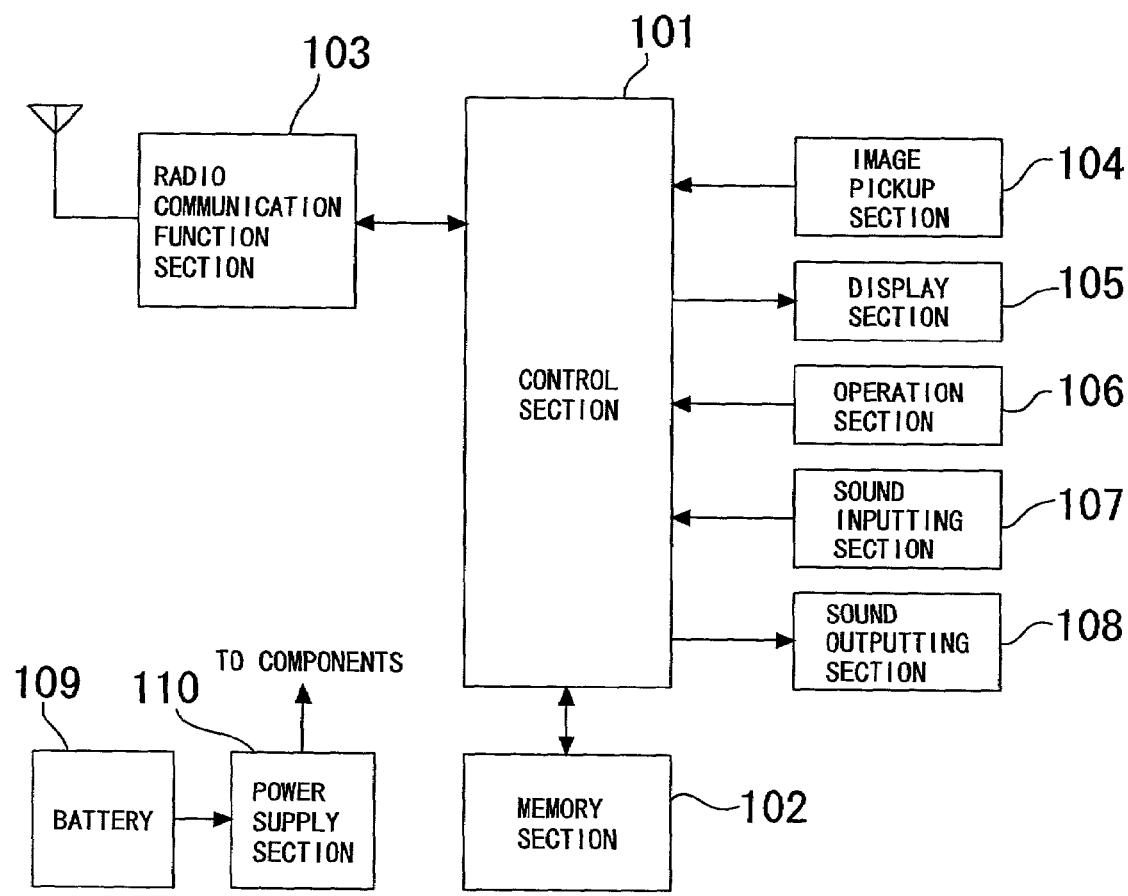
FIG. 1 is a block diagram showing a configuration of a portable communication terminal to which the present invention is applied.

Referring first to FIG. 1, there is shown a configuration of a portable telephone terminal to which the present invention is applied. The portable telephone terminal shown includes a control section 101 which operates in accordance with a program, a memory section 102 in which programs, image data and so forth for the control section 101 are stored, a radio communication function section 103 for performing radio communication, an image pickup section 104 which may be a CCD camera or the like for picking up a still picture or a moving picture and converting it into a digital signal, a display section 105 which may be an LCD (liquid crystal display) unit or the like for displaying an image or characters thereon, an operation section 106 which includes ten-keys and several function keys, a sound inputting section 107 which may be a microphone for inputting sound or voice to be communicated, a sound outputting section 108 which may be an earphone or a speaker, a cell or battery 109, and a power supply section 110 for stabilizing power of the battery 109 and distributing the stabilized power to the components of the portable communication terminal to enable operation of the portable communication terminal.

Figure 2:
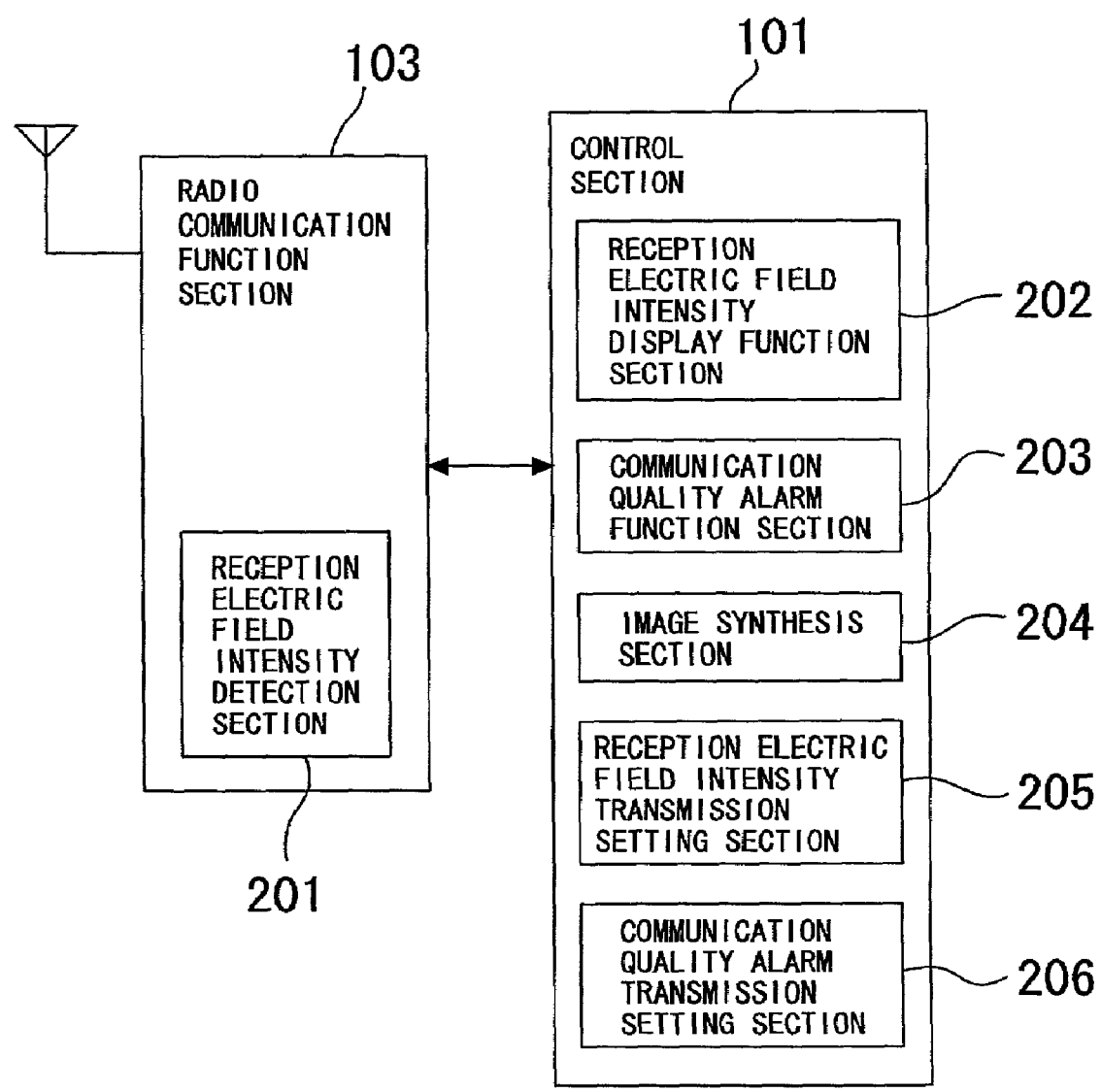
FIG. 2 is a block diagram showing a detailed configuration of the portable communication terminal of FIG. 1.

Referring now to FIG. 2, the radio communication function section 103 includes a reception electric field intensity detection section 201 and transmits a result of detection by the reception electric field intensity detection section 201 to the control section 101. The control section 101 includes a reception electric field intensity display function section 202 for displaying a reception electric field intensity display on the display section 105 based on reception electric field intensity information from the radio communication function section 103, and a communication quality alarm function section 203 for instructing the display section 105 or the sound outputting section 108 to display an alarm display or emit alarm sound when the circuit quality deteriorates below a predetermined value.

Further, the control section 101 includes an image synthesis section 204 for producing a transmission image by synthesizing a still picture or a moving picture picked up by the image pickup section 104 built in the portable telephone terminal body and a reception electric field display or an image stored in the memory section 102. The control section 101 further includes a reception electric field intensity transmission setting section 205 for setting whether or not a reception electric field intensity image should be added to a transmission image in accordance with an operation of the operation section 106, and a communication quality alarm transmission setting section 206 for setting whether or not an alarm image should be used as a transmission image when a communication quality alarm is generated.

Now, operation of the portable telephone terminal is described in detail with reference to FIGS. 1 to 5.

First, operation upon normal communication is described.

The radio communication function section 103 measures a reception electric field intensity by means of the reception electric field intensity detection section thereof 201 during waiting or communication of the portable telephone terminal. A result of the measurement is displayed as a reception level display on the display section 106 by means of the reception electric field intensity display function section 202 of the control section 101 as in a conventional portable telephone terminal.

Communication by a video and an audio is performed in the following manner by control of the control section 101. In particular, an image picked up by the image pickup section 104 and sound inputted from the sound inputting section 107 are transmitted. On the other hand, a received video is displayed on the display section 105 and a received audio is outputted by the sound outputting section 108. Further, operation relating to the communication is performed by the operation section 106.

Figure 3:
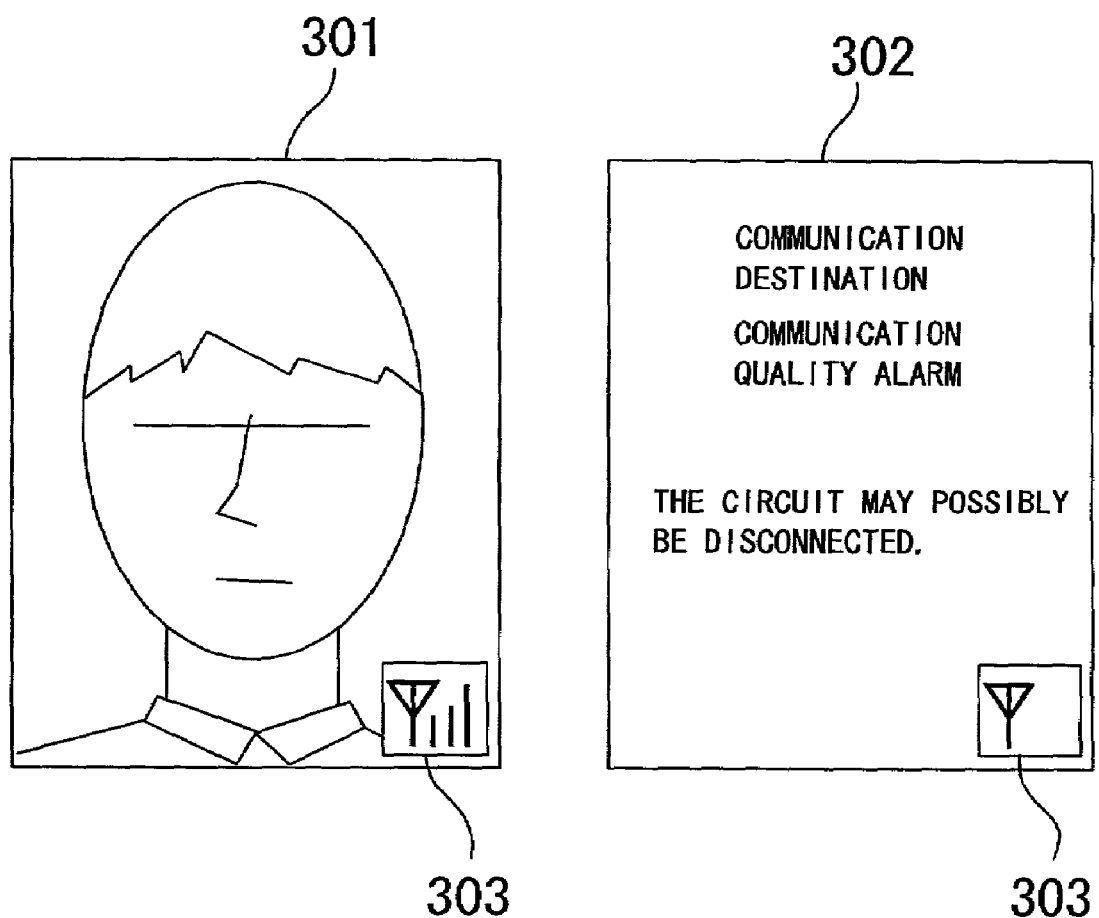
FIG. 3 is a schematic view illustrating an example of a transmission image by the portable communication terminal of FIG. 1.

An image to be transmitted from the portable telephone terminal upon such communication by a video and an audio as described above is shown as a transmission image example 301 in FIG. 3. As shown in FIG. 3, a transmission image includes a reception level display 303 of the portable telephone terminal itself added by the image synthesis section 204 of the control section 101 to an image (in the example of FIG. 3, an image of a person) picked up by the image pickup section 104.

It is to be noted that such a transmission image example 301 as described above is displayed when the user operates the operation section 16 to set in advance to transmit the reception level display of the portable telephone terminal itself. However, if the user sets that the reception level display of the portable telephone terminal itself should not be transmitted, then the reception level display of the portable telephone terminal itself is not transmitted, but only the picked up image is transmitted. Such setting is performed by the reception electric field intensity transmission setting section 205 in the control section 101.

In the following, operation upon generation of a circuit quality alarm is described.

If the circuit quality during communication deteriorates lower than a prescribed value, then sound representing this is emitted from a receiver and a sounder of the sound outputting section 108 by the communication quality alarm function section 203 using a known technique.

An image transmitted from the portable telephone terminal upon generation of a communication quality alarm is shown as a transmission image example 302 in FIG. 3. As seen from FIG. 3, the transmission image is not the image picked up by the image pickup section 104 but a still image stored in advance in the memory section 102 and read out by the control section 101. It is to be noted that such a transmission image example 302 as described above is displayed when the user operates the operation section 106 to set in advance to transmit the reception level display of the portable telephone terminal itself. However, if the user sets that the reception level display of the portable telephone terminal itself should not be transmitted, then the reception level display of the portable telephone terminal itself is not transmitted, but only the picked up image is transmitted. Such setting is performed by the communication quality alarm transmission setting section 206 in the control section 101.

A flow of the operation described above is illustrated in FIG. 5. After starting of communication by a video and an audio (step 501), if a communication quality alarm is generated (YES in step 502), then if it is set in advance that an alarm image should be used as a transmission image (YES in step 503), then the control section 101 sets the alarm image in the memory 102 as the transmission image (step 504).

A display screen of an opposite party terminal having received an image transmitted from the portable telephone terminal described above is shown in FIG. 4. As seen from a waiting screen example 401, while the opposite party portable telephone terminal is in a waiting state, a reception level display 404 of the opposite party portable telephone terminal is displayed. An example of a display when an image transmitted from the portable telephone terminal of FIG. 1, that is, the transmission image example 301 or the transmission image example 302 shown in FIG. 3, is received by and displayed on the opposite party portable telephone terminal is shown as a communication screen example 402 and as a communication screen example 403 upon generation of a communication quality alarm. As seen from the communication screen example 402, also a reception electric field level 404 of the opposite party portable telephone terminal is displayed in a reception image 405, and as a result, the reception electric field situation of the opposite party can be confirmed. Further, if a communication quality alarm is generated, then since the alarm screen is received and displayed as seen from the communication screen example 403, the user can confirm through the sense of sight that there is the possibility that the circuit may be disconnected.

A different transmission image may be transmitted from the portable telephone terminal and received by and displayed on the opposite party portable telephone terminal.

Referring to FIG. 6, an example of the different transmission image is shown as a transmission image example 601 and includes a reception level display 603 of the portable telephone terminal itself similarly as in the transmission image example 301 shown in FIG. 3. However, the transmission image upon generation of a communication quality alarm is different from the transmission image example 302. In particular, an image transmitted from the portable telephone terminal upon generation of a communication quality alarm is shown as a transmission image example 602. As seen from FIG. 6, the transmission image includes not only an image (in the example of FIG. 6, an image of a person) picked up by the image pickup section 104 but also another still image stored in the memory 102, read out by the control section 101 and synthesized by the image synthesis section 204 of the control section 101.

Figure 4:
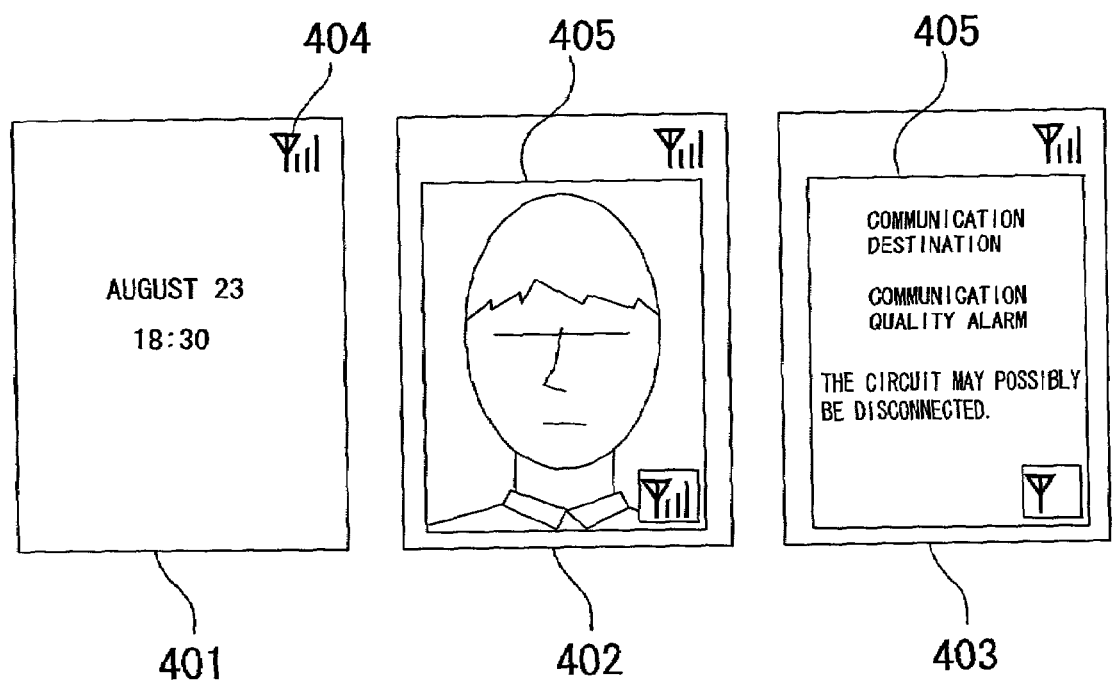
FIG. 4 is a schematic view showing an example of a screen display of the opposite party upon communication of the portable communication terminal of FIG. 1.
Figure 5:
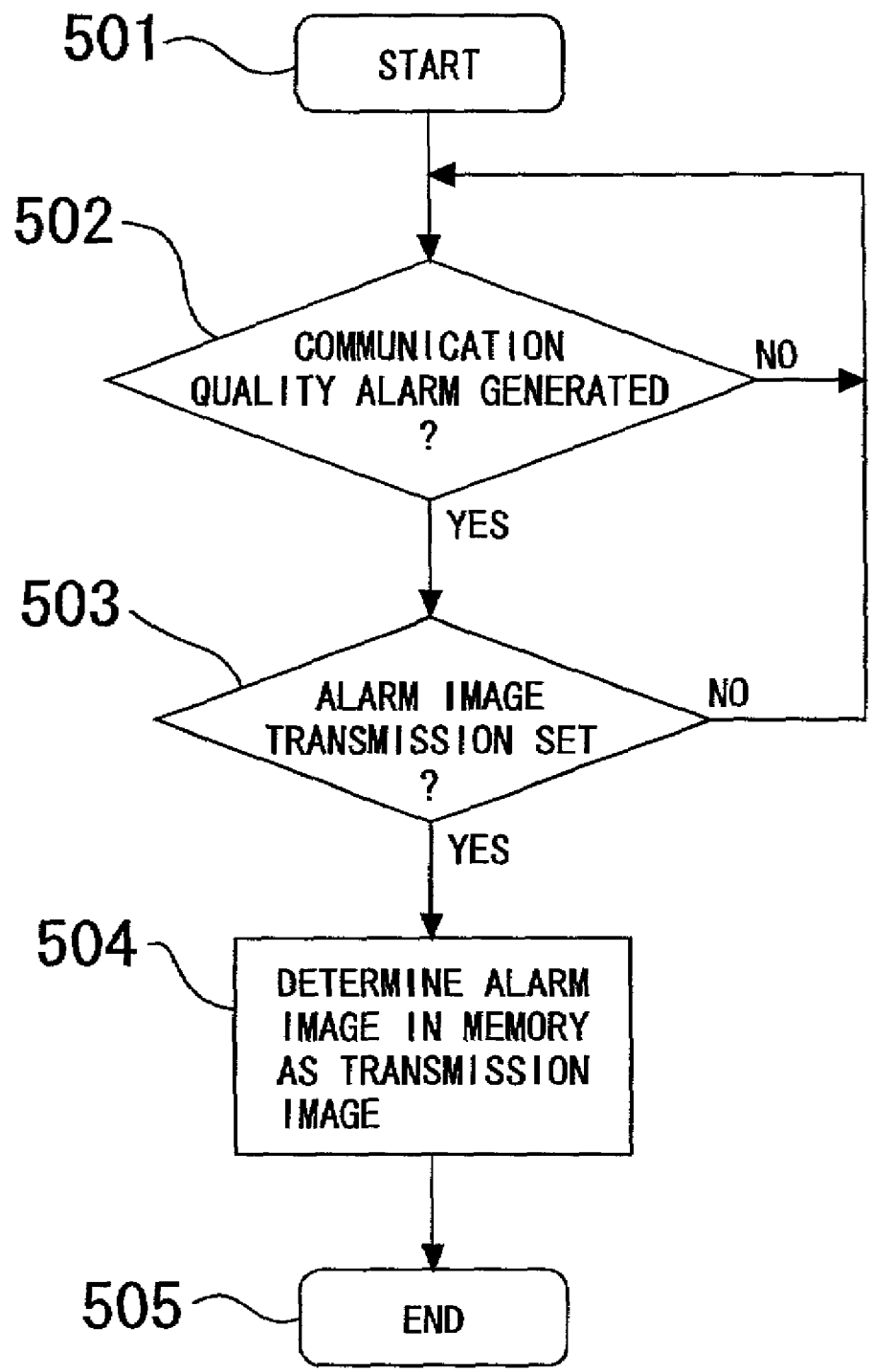
FIG. 5 is a flow chart illustrating operation of the portable communication terminal of FIG. 1.
Figure 7:
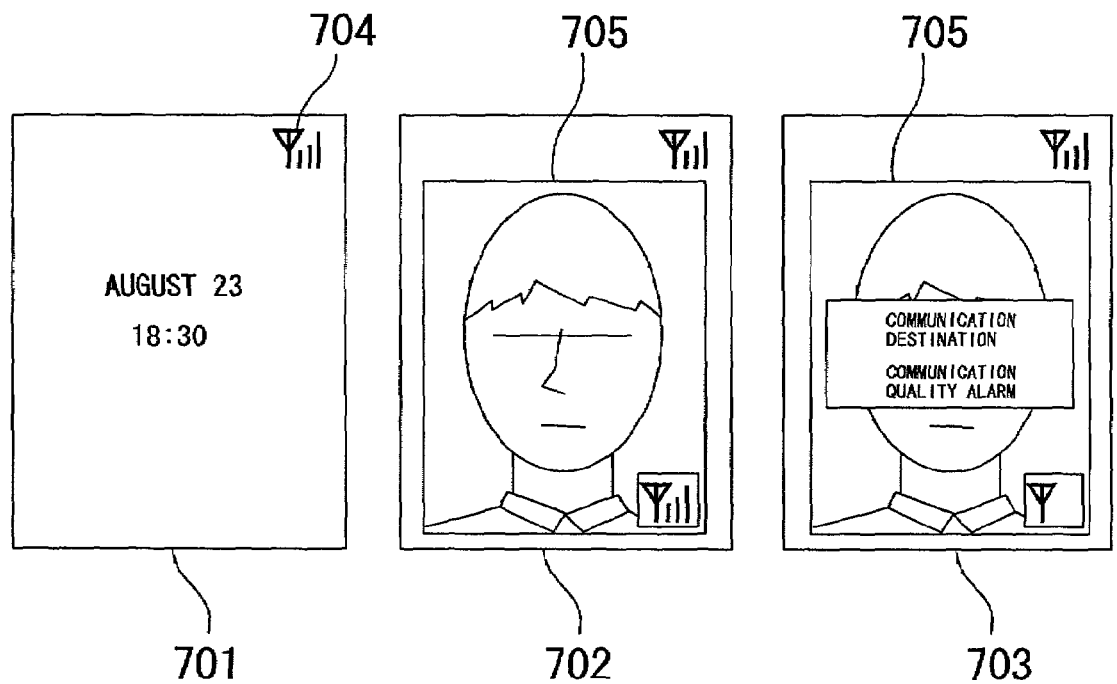
FIG. 7 is a schematic view showing an another example of a screen display of the opposite party upon communication of the portable communication terminal of FIG. 1.

On the other hand, on the opposite party portable telephone terminal, when the opposite portable telephone terminal is in a waiting state, a reception level display 704 of the opposite party portable telephone terminal is displayed as seen from a waiting screen example 701 similarly as in the waiting screen example 401 of FIG. 4. During communication, also an opposite party reception electric field level 704 is displayed in a reception image 705 as seen from a communication screen example 702 similarly as in the communication screen example 402 of FIG. 4. If a communication quality alarm is generated in the portable telephone terminal of FIG. 1, then a communication screen example 703 upon generation of a communication quality alarm is displayed as a reception image on the opposite party portable telephone terminal as seen in FIG. 7. On the communication screen example 703, also the image picked up by the image pickup section 104 can be confirmed continually.

Figure 8:
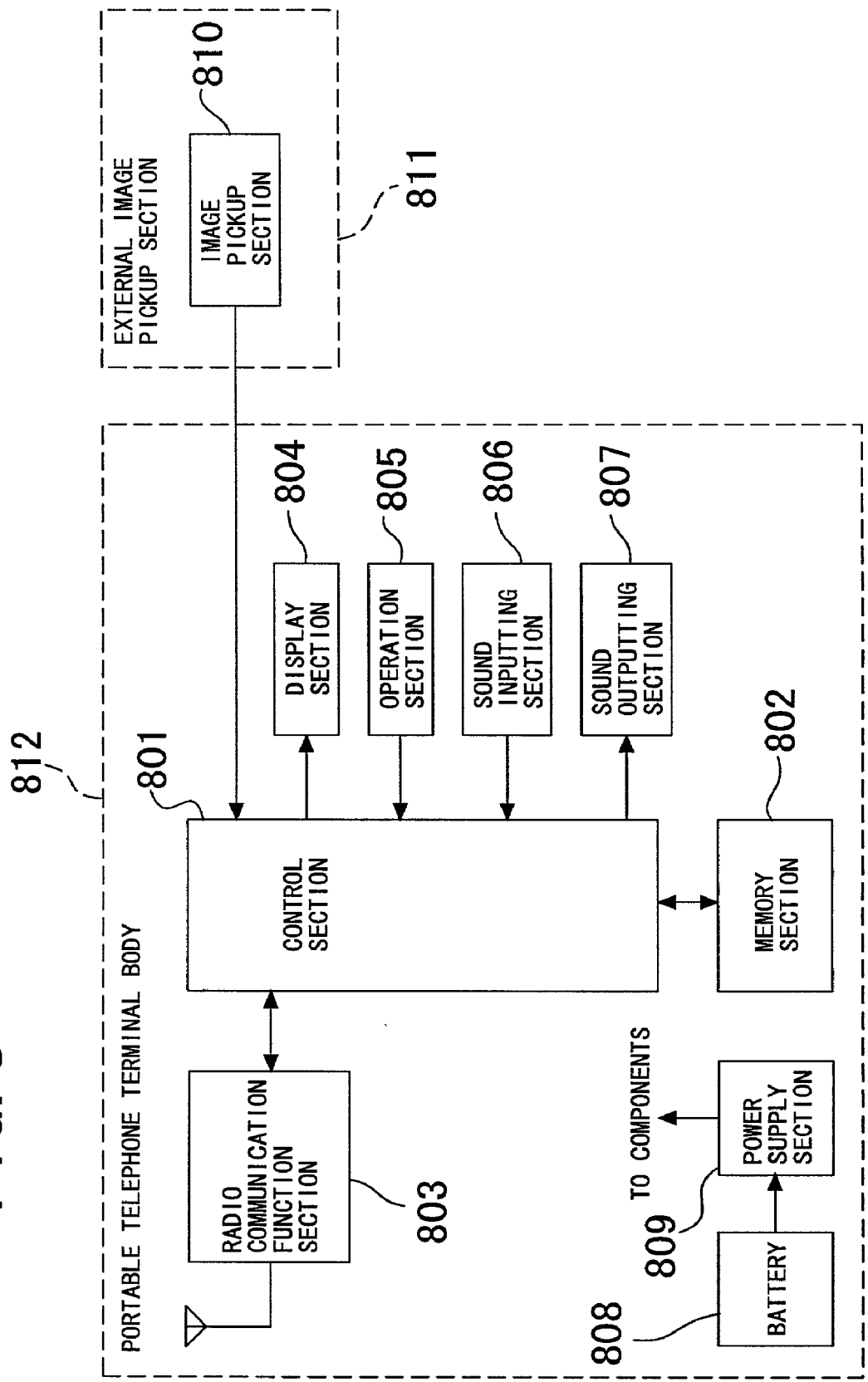

Referring now to FIG. 8, there is shown another portable telephone terminal to which the present invention is applied. The portable telephone terminal includes a control section 801, a memory section 802, a radio communication function section 803, a display section 804, an operation section 805, a sound inputting section 806, a sound outputting section 807, a cell or battery 808 and a power supply section 809 which are similar to the control section 101, memory section 102, radio communication function section 103, display section 105, operation section 106, sound inputting section 107, sound outputting section 108, battery 109 and power supply section 110 of the portable telephone terminal of FIG. 1, respectively. The components 801 to 809 of the portable telephone terminal are built in a body 812 of the portable telephone terminal. The portable telephone terminal of FIG. 8 is different from the portable telephone terminal of FIG. 1 in that an image pickup section 810 which may be a CCD camera or the like and corresponds to the image pickup section 104 of the portable telephone terminal of FIG. 1 is not built in the portable telephone terminal body 812, but an external image pickup section 811 including the image pickup section 810 is connected to a connection terminal of the portable telephone terminal body 812 when necessary. The configuration and operation after the connection are similar to those of the portable telephone terminal described with reference to FIG. 1.

Figure 9:
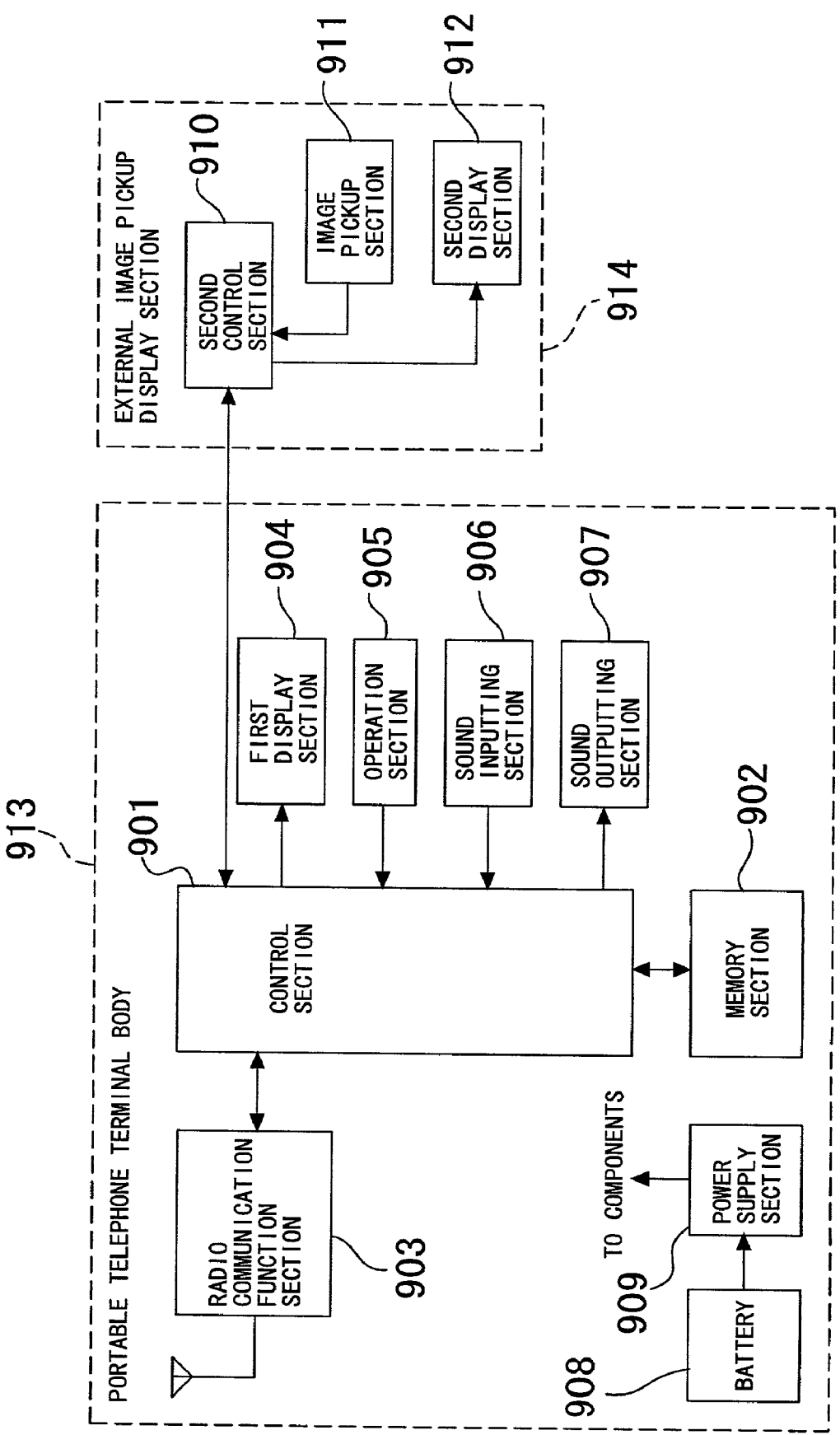

Referring now to FIG. 9, there is shown a further portable telephone terminal to which the present invention is applied. The portable telephone terminal can be considered to be a modification to the portable telephone terminal of FIG. 8 and includes a first control section 901, a memory section 902, a radio communication function section 903, a first display section 904, an operation section 905, a sound inputting section 906, a sound outputting section 907, a cell or battery 908 and a power supply section 909 which are similar to the control section 801, memory section 802, radio communication function section 803, display section 804, operation section 805, sound inputting section 806, sound outputting section 807, battery 808 and power supply section 809 of the portable telephone terminal of FIG. 8, respectively. The components 901 to 909 of the portable telephone terminal are built in a body 913 of the portable telephone terminal. Meanwhile, an external image pickup display section 914 which corresponds to the external image pickup section 811 of FIG. 8 includes, in addition to an image pickup section 911 which corresponds to the image pickup section 810, a second control section 910 and a second display section 912.

Generally, the size of a display section built in a portable telephone terminal is restricted such that the portability as a portable telephone set is not lost. Therefore, a conventional portable telephone terminal is small in size where it is used as a visual telephone set. Therefore, in the portable telephone terminal of FIG. 9, the second display section 912 is formed as an external equipment together with the image pickup section 911. The second control section 910 performs displaying control of the second display section 912 and processing of image data transmitted from the image pickup section 911. The second control section 910, however, may otherwise be formed as a single control section together with the first control section 901. General operation of the portable telephone terminal of FIG. 9 is similar to that of the portable telephone terminal of FIG. 1. It is to be noted, however, that a reception image from an opposite portable telephone terminal when the portable telephone terminal is used as a visual telephone set is displayed on the second display section 912.

Referring now to FIG. 10, there is shown a still further portable telephone terminal to which the present invention is applied. The portable telephone terminal can be considered to be a modification to the portable telephone terminal of FIG. 9 and includes a first control section 1001, a memory section 1002, a radio communication function section 1003, a first display section 1005, an operation section 1006, a sound inputting section 1007, a sound outputting section 1008, a cell or battery 1009 and a power supply section 1010 which are similar to the first control section 901, memory section 902, radio communication function section 903, first display section 904, operation section 905, sound inputting section 906, sound outputting section 907, cell or battery 908 and power supply section 909 of the portable telephone terminal of FIG. 9, respectively. The components 1001 to 1003 and 1005 to 1010 of the portable telephone terminal are built in a body 1015 of the portable telephone terminal. The portable telephone terminal further includes an image pickup display section 1016 which corresponds to the external image pickup display section 914 of the portable telephone terminal of FIG. 9 and includes a second control section 1012, an image pickup section 1013 and a second display section 1014 which correspond to the second control section 910, image pickup section 911 and second display section 912 of the portable telephone terminal of FIG. 9, respectively. The portable telephone terminal of FIG. 10 is different from the portable telephone terminal of FIG. 9 principally in that the image pickup display section 1016 is formed as a fully separate and independent unit from the portable telephone terminal body 1015. Thus, in order to allow communication between the portable telephone terminal body 1015 and the image pickup display section 1016, the portable telephone terminal additionally includes a second radio communication function section 1004 provided in the portable telephone terminal body 1015 and a third radio communication function section 1011 provided in the image pickup display section 1016. In the portable telephone terminal, the connection between the portable telephone terminal body 1015 and the image pickup display section 1016 is established by radio communication between the second radio communication function section 1004 and the third radio communication function section 1011. General operation of the portable telephone terminal is similar to that of the portable telephone terminal described hereinabove with reference to FIG. 1. Also in the portable telephone terminal of FIG. 10, a reception image from an opposite portable telephone terminal when it is used as a visual telephone set is displayed on the second display section 1014 similarly as in the portable telephone terminal of FIG. 9.

In the portable telephone terminals described above, a still image is used as the transmission image read out from the memory upon generation of a communication quality alarm. However, a moving image may be used as the transmission image. Where a moving image is used, a further attention of the other party of communication can be called visually.

Further, the present invention can be applied not only to a portable telephone terminal with a visual telephone function but also, for example, to a portable communication terminal which includes a built-in digital camera or can be connected to an external digital camera as an image pickup section and merely has a function of transmitting an image picked up by the digital camera to an opposite portable telephone terminal.

The portable telephone terminal described above is advantageous in that a countermeasure for preventing expected disconnection of the circuit during communication can be taken and the portable communication terminal can be used with improved convenience because an electric field intensity state of the portable communication terminal is transmitted as an image to the opposite party of image communication and besides the alarm image stored in the memory in advance is transmitted if a communication quality alarm is generated in the portable communication terminal.

The portable telephone terminal is advantageous also in that information of the electric field situation of it can be acquired by the opposite party of image communication irrespective of whether or not the opposite party of communication has a similar function to the unique function of the portable telephone terminal because the information is transmitted as an image.

While preferred embodiments of the present invention have been described using specific terms, such description is for illustrative purposes only, and it is to be understood that changes and variations may be made without departing from the spirit or scope of the following claims.

What is claimed is:

1. A portable communication terminal with an image transmission function for transmitting an image, comprising:
    reception electric field intensity detection means for detecting a reception electric field intensity of said portable communication terminal;
    reception electric field intensity image transmission means for transmitting a reception electric field intensity image representative of the detected reception electric field intensity to the opposite party of communication; and
    an image pickup section for picking up an image, and wherein said reception electric field intensity image transmission means transmits the reception electric field intensity image together with an image picked up by said image pickup section.

2. A portable communication terminal with an image transmission function as claimed in claim 1, further comprising reception electric field intensity transmission setting means for setting whether or not the reception electric field intensity image should be transmitted.

3. A portable communication terminal with an image transmission function as claimed in claim 1, further comprising communication quality alarm image transmission means for transmitting a communication quality alarm image to the opposite party of communication when a communication quality alarm is generated in said portable communication terminal.

4. A portable communication terminal with an image transmission function as claimed in claim 3, further comprising communication quality alarm transmission setting means for setting whether or not a communication quality alarm image should be transmitted.

5. A portable communication terminal with an image transmission function as claimed in claim 1, wherein said image pickup section is removably and externally provided on a body of said portable communication terminal.

6. A portable communication terminal with an image transmission function as claimed in claim 1, wherein said image pickup section is provided separately from a body of said portable communication terminal and includes a radio communication function section which communicates by radio with a radio communication function section of said body of said portable communication terminal.

7. A portable communication terminal with an image transmission function as claimed in claim 1, wherein a body of said portable communication terminal has a visual telephone function and said image pickup section has a display section capable of displaying an image received from the opposite party by said body of said portable communication terminal when said visual telephone function is operative.

* * * * *